Inventor
JOHN ROBERT CARTWRIGHT
By [signature]
Attorney

United States Patent Office 2,749,440
Patented June 5, 1956

2,749,440

THERMIONIC VALVE CIRCUITS

John Robert Cartwright, Letchworth, England, assignor to The British Tabulating Machine Company Limited, London, England, a British company Application August 4, 1950, Serial No. 177,755

Claims priority, application Great Britain May 17, 1950

12 Claims. (Cl. 250—27)

This invention relates to improvements in electronic devices for comparing data.

It has been proposed to employ electronic devices having more than one stable state for the static registration of data. Examples of such devices are gas filled thermionic valves and trigger circuits. Both these devices are bi-stable. In the gas valves the two states are non-conduction and full conduction; in the thermionic valve trigger circuit, the first state is with one valve non-conducting and the other valve fully conducting and in the second state the first valve is fully conducting and the other non-conducting.

These bi-stable devices may be used for data registration by arbitrarily assigning to one stable state the signification of "on," or the presence of data, and to the other stable state the signification of "off," or absence of data.

Bi-stable static data registering devices may be used individually for storing separate items of data or they may be combined in groups to form multi-denominational storage units or registering counters, in which case, for example, four devices might register any digit from zero to fifteen.

It is also possible to use devices having more than two stable states. An example of this is the so-called "ring counter" in which ten valves may be used to register any digit from zero to ten. Each valve is assigned a particular digital value and by being in conductive state indicates the registration of the corresponding digital value.

In general, it is necessary to provide means for transferring data to and from static registering devices of the same denominational order but belonging to different groups. For example, a number may be transferred from one storage unit to another or from a storage unit to a counter.

It has been proposed to use for this purpose both trigger circuits and multi-grid "gate" valves either independently or in combination. Examples of the use of a trigger circuit and a pentode operating in combination are to be found in United States Appln. Serial No. 38,078, filed July 9, 1948, Patent No. 2,658,681.

When the registering devices form part of an electronic calculating machine performing multiplication and/or division, it is desirable that provison should also be made for transferrng data from one denominational order of a counter or storage unit to another denominational order of the same counter or storage unit. Thus in a commonly employed method of multiplication, after multiplication of the multiplicand by one multiplier digit, all the multiplicand digits require to be shifted one denominational order before multiplication by the next multiplier digit commences. In the decimal system each shifting by one order is equivalent to a division or multiplication by ten. This process is commonly called "column shifting" and the same term is often used when multiplication by a power of ten is involved, in the case of a non-uniform notation such as sterling currency.

This column shifting may be performed by the use of a network of multi-grid valves which are operated selectively to cause the data transferred through the network to be denominationally shifted as required. An example of such a network is shown in United States Appln. Serial No. 38,078, filed July 9, 1948. The number of valves employed in such a network is large when several denominations and several column shift positions are required. Furthermore, two groups of registering devices are required, one to hold the original value and one to accept the column shifted value. Using the particular network referred to above, the time for column shifting is not negligible since a minimum of ten pulses has to be employed.

It will be appreciated that these proposed data transfer arrangements tend to be of considerable complexity and cost, requiring large numbers of expensive multi-grid valves with their associated components and high tension voltage supplies.

Accordingly, it is an object of the present invention to provide simpler and cheaper means for transferring data to and from data registering devices utilising a data comparing circuit employing diode valves only.

It is a further object of the present invention to provide simplified means for effecting column shifting of a value registered on a group of electronic registering devices using a single group of such devices only.

According to the invention, a circuit for comparing two pairs of data representing voltages, employes two diodes which in one condition of the comparison permit an operating pulse applied thereto to be transmitted as an output pulse and in another condition of the comparison to attenuate the said operating pulse to a degree sufficient to render the output pulse inoperative.

In the preferred form of the invention, the comparison circuit comprises four resistances connected in two pairs, each resistance connected to a potential source to be compared and two diodes connected together and between the centre points of the pair of resistances, the diodes having one pair of corresponding electrodes commoned, and a pulse input via a resistor, a pulse output and a constant potential applied to the common connection of the two diodes.

The invention will now be described by way of example with reference to the accompanying drawings, in which.

Figure 1:
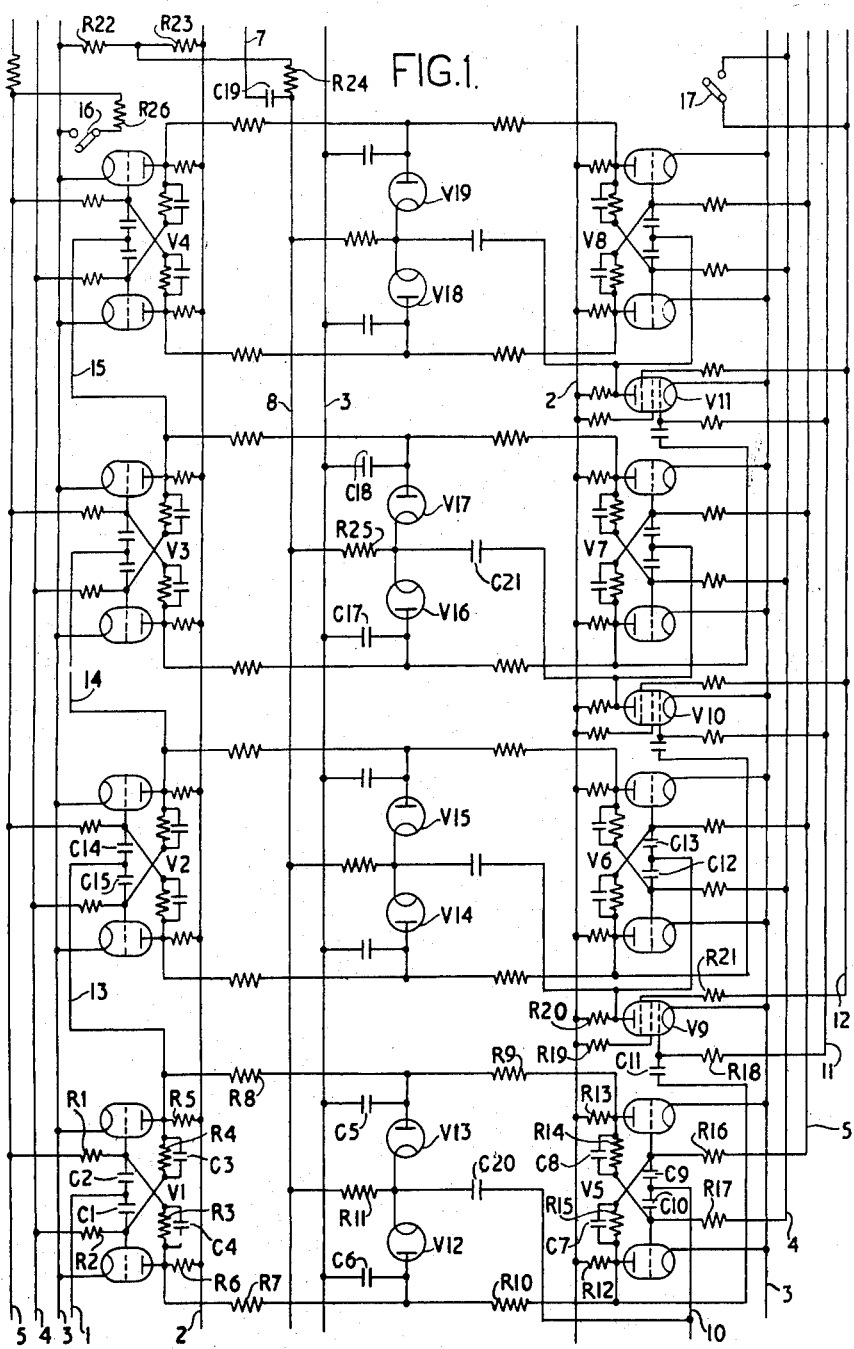
Figure 1 shows a circuit for transferring data from one counter to a second counter.

In Figure 1 are shown two units capable of adding and registering any number of pulses up to fifteen and the diode comparing circuits which control transfer of data from one unit to the other.

One of the counters comprises the four pairs of triodes V1 to V4, each pair preferably being the two halves of a double triode valve. Since each of the four stages are substantially similar, only the first will be described in detail.

The two chains of resistors R2, R4, R5 and R1, R3, R6 form potentiometers between the H. T. supply line 2 (+200 v.) and the negative bias lines 4 and 5 (—100 v.). The anode of the upper triode V1 is connected to the junction of R4 and R5, and the cathode to the ground potential line 3, so that if this valve is conducting, the voltage drop across resistor R5 is increased, consequently reducing the potential of the grid of the lower versed and the two trigger circuits will have the same setting. In cases (1) and (4), no pulse is required since the settings are already correct, as shown in the table. Thus when the initial conditions of the two trigger circuits are alike, no pulse is applied to V5, whilst when the two conditions are unlike a negative operating impulse must be applied to V5.

By way of example, it will be assumed that when one of the triodes in a trigger circuit is conducting, the anode voltage will be +80 volts and that when the trigger circuit is in the other condition with the triode non-conducting, the anode voltage increases to +160 volts. The resistors R7, R8, and R9 and R10 (Figure 1) are all equal and considerably greater in value than the triode anode load resistors. Hence to a close approximation, the voltage at the junction of R7, R10 and R8, R9 will be the mean of the potentials of the anodes to which they are connected. Thus, these mid-point potentials may assume three different values depending upon the combination of the trigger circuit conditions.

TABLE II

|     | V1  | V5  | Mid-point of R8, R9 | Mid-point of R7, R10 |
| --- | --- | --- | --- | --- |
| (1) | On  | On  | 160 volts | 80 volts |
| (2) | Off | On  | 120 volts | 120 volts |
| (3) | On  | Off | 120 volts | 120 volts |
| (4) | Off | Off | 80 volts | 160 volts |

Line 8 is connected through resistors such as R11 and R25 to the cathodes of each pair of diodes and also through R24 to the potentiometer comprising resistors R22 and R23 connected between the ground line 3 and the H. T. line 2. This potentiometer is so proportioned that the fixed D. C. voltage applied to the cathodes is approximately +158 volts. Thus if a diode anode is held at +160 volts by the setting of the related trigger circuits, then the anode will tend to be at +2 volts with respect to the cathode and the diode will be conducting. If the diode anode is at either +120 volts or +80 volts, then it will be negative with respect to the cathode and the diode will be non-conducting.

When it is required to transfer data from one counter to another, line 12 is first made fully negative by closing switch 17, thus rendering the isolating pentodes inoperative and preventing pulses passing from one trigger circuit to another in the right hand counter. A short duration negative impulse of, for example, 60 volts amplitude is then applied to line 7 from a suitable source. This pulse will be transmitted to all the diode cathodes via condenser C19, line 8 and the related resistors. If either of the diode anodes is at +160 volts, then the diode will be already conducting and will present a low impedance path to earth through the related condenser. If the diode anode is at +120 volts, then the cathode will be driven by the pulse to approximately the same potential before the diode conducts. Thus, in this case, a negative pulse of approximately 40 volts amplitude is developed across the diode and fed to the appropriate trigger circuit in the right hand counter.

The circuit comprising V1, V5 and the diodes V12 and V13 will now be considered in more detail in relation to the cases set out in Table II.

*Case I*

Diode V13 will be conducting initially, so that when the negative pulse is applied it will be shunted through diode V13 and condenser C5 to ground line 3. The condenser is sufficiently large to present a very low impedance to the pulse, so that the pulse voltage developed across the diode is approximately equal to the ratio of the diode resistance to the resistance R11, if R11 is large compared with the diode resistance. Thus, without difficulty, the voltage developed across the diode may be reduced to, say, one twentieth of the voltage developed across R11 and the diode in series. This attenuated pulse voltage is applied via C20, C9 and C10 to the grids of V5 trigger circuit. However, the amplitude is such that it is below the threshold triggering voltage so that the trigger circuit is not operated.

*Case II*

For both diodes the anode voltage is approximately 40 volts negative with respect to the cathodes, hence the cathodes may fall to +120 volts when the pulse is applied before both diodes conduct, thus limiting the pulse to 40 volts amplitude irrespective of the initial amplitude. This pulse will be transmitted to V5 via C20 and being greater than the trigger voltage threshold will switch the trigger circuit over to the other stable condition.

*Case III*

The same conditions apply as for Case II.

*Case IV*

In this case diode V12 is conducting initially, so that when the pulse is applied it will be shunted through diode V12 and condenser C6 and thus an attenuated pulse only will be transmitted via C20.

It will be apparent that a data setting may be transferred from V2 to V6, V3 to V7 and V4 to V8 in the same manner as has been described for the transfer between V1 and V5.

Suppose, for example, that the left hand counter has registered therein the value 7 and the right hand counter has registered the value 9. It is required to transfer the registration from the left hand counter to the right hand counter, at the same time clearing the existing registration. The condition of the various trigger circuits and the operating impulses are indicated in Table III.

TABLE III

| L. H. Counter | R. H. Counter Initially | Pulses | R. H. Counter Final |
| --- | --- | --- | --- |
| V1—On | V5—On  | No  | V5—On |
| V2—On | V6—Off | Yes | V6—On |
| V3—On | V7—Off | Yes | V7—On |
| V4—Off| V8—On  | Yes | V8—Off|

Thus it will be seen that when corresponding trigger circuits are in opposite conditions, an operating impulse is transmitted and when they are in the same condition an impulse is not transmitted.

With the values quoted in the examples the operating impulse is limited to approximately 40 volts. This is advantageous in that an impulse of uniform amplitude is applied to all stages when transferring data, provided that the impulse on line 7 is greater than this value. Since the impulse on line 7 is applied in parallel to the various pairs of diodes, it is desirable that the impulse should be supplied from a source of low impedance, such as the well known cathode follower circuit. The use of a low impedance also prevents any tendency for spurious coupling between trigger circuits by paths such as that from the grids of V5, condenser C20, resistor R11, line 8, resistor R25, and condenser C21 to the grids of V7.

The condensers C5 and C6 and corresponding condensers in the other diode circuits not only act as by-pass condensers for the applied pulse, but also form with resistors R7, R8, R9, etc., circuits with a time constant long compared with the operating pulse. For this reason, there is no tendency for the diode anode voltages to change during the application of the pulse should the trigger switching overtime be comparable with the duration of the pulse.

It will be appreciated from the examples given that it is possible to transfer data from one counter to another by the application of a single pulse, irrespective of the number of stages or denominations involved and that the transfer is effected without requiring a preliminary resetting operation on the receiving counter.

If in Figure 1 the lines 13, 14 and 15 were disconnected from the respective anodes, then each trigger circuit would register independently, data representing pulses being applied independently to these lines. The right hand counter might be left as shown or similarly treated, in which case the coupling pentodes V9, V10 and V11 would be unnecessary. In both these cases, however, data transfer would be performed in the manner already described, except that in the second case no action would be necessary to suppress coupling between the trigger circuits V5, V6, etc.

In British Patent No. 609,502 is shown and described means for converting a binary counter into a decimal counter by the use of a locking valve. The binary counters shown in Figure 1 may be converted to decimal working in this way, provided that the lock valve is a pentode. The control grid, anode and cathode connections are as for the triode valve shown in British Patent No. 609,502. The screen grid is connected to the H. T. line 2 through a suitable resistor and the suppressor grid is connected to line 12, thus enabling the locking valve to be disabled at the same time as the pentodes V9, V10 and V11 are disabled.

The comparison of the data registrations of two counters controlling the transfer of data from one to the other has been described. However, it is sometimes necessary, as for example in a dividing machine, to compare the magnitudes of two registered values, the result of the comparison determining whether a data transfer shall be effected. This may be done without comparing each digit with the corresponding digit in the other value. This is so since if the pairs of digits are compared, beginning with the highest denomination, the first comparison which is other than equal determines the relative magnitudes of the two values.

Figure 2:
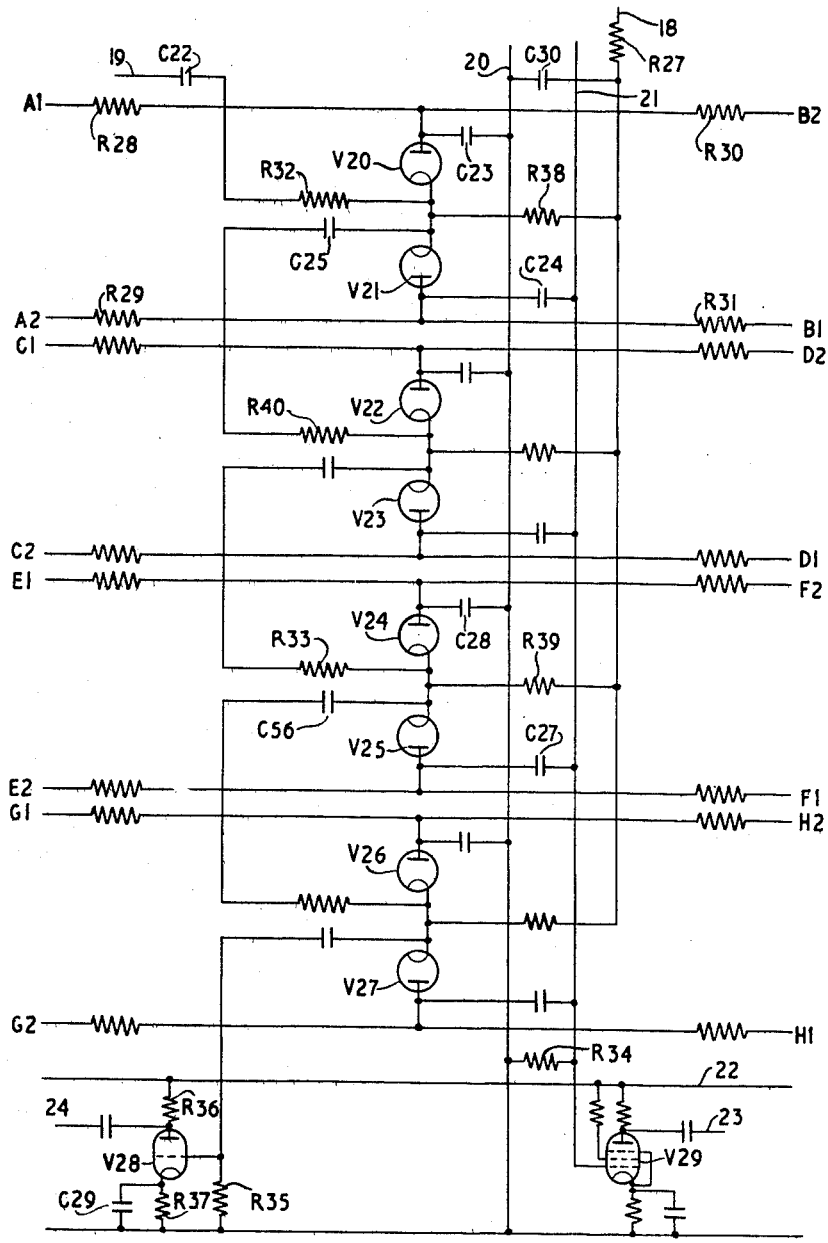
Figure 2 shows means for comparing the values registered on two groups of electronic registering devices.

The diode circuit already described may be readily adapted for performing this comparison, as shown in Figure 2.

The anodes of the trigger circuits to which the diodes are connected are indicated by A1, A2, B1, etc. Anode A1 is the anode which is at the lower potential when trigger A is "off," and anode A2 is at the higher potential and similar nomenclature is used for the other trigger circuits which are not shown since they may be of the same form as V1 of Figure 1.

In Figure 1 the two resistors joined to the anode of each diode go to corresponding anodes of the two related trigger circuits, that is to say, anodes which are at the same potential when the trigger circuits are in the same condition. In Figure 2, however, each diode is connected to opposing anodes, thus, for example, R28 is connected to the normally low potential anode of trigger circuit A and R30 is connected to the normally high potential anode of trigger circuit B. Thus, the conditions for the transmission of a pulse applied on line 19 will be reversed as compared with Table I and are shown in Table IV.

Table IV

| Trigger A | Trigger B | Pulse Transmitted |
| --- | --- | --- |
| On | On | Yes |
| Off | On | No |
| On | Off | No |
| Off | Off | Yes |

It will be noted that a pulse is transmitted when the two trigger circuits A and B are in the same condition but not when they are in opposite conditions.

Line 18 is connected to a suitable positive potential to fix the D. C. level of the diode cathodes through R27 and R38 for example. The condenser C30 serves as a by-pass to prevent a pulse on the cathodes of one diode pair being fed to another diode pair via line 18.

If trigger circuits A and B are in the same condition then neither diode will be conducting and assuming the same voltage distribution as before, when a negative pulse is applied on line 19, then a 40 volt pulse will be transmitted to the diode pair V22 and V23 via C22, R32, C25 and R40, if R38 is large in value compared with R32 and if trigger circuits A and B are in the same state. If the remaining pairs of trigger circuits, C and D, E and F, G and H are also set in corresponding states, then the pulse will be successively transmitted from one diode pair to the next down the chain and a negative pulse will finally appear across resistor R35. The triode V28 is biased 1 to 2 volts negatively by the auto bias combination R37 and C29, so that substantial anode current is normally being passed. The negative pulse developed across R35 and applied to the grid of V28 will cut this valve off for the duration of the pulse, so that a positive pulse will be developed across the anode load resistor R36 and will be transmitted to line 24.

If the left hand set of trigger circuits register a higher value than the right hand set, then one of the trigger circuits A, C, E or G, will be "on," whilst the corresponding trigger circuit will be "off." If, for example, E is "on" and F is "off," then diode V24 will be conducting initially, so that the pulse will be shunted to the ground line 20 through this diode and condenser C28, a pulse will not be passed on to the next diode pair and V28 will not be operated.

If the registration is reversed, with E "off" and F "on," then diode V25 will be initially conducting and the pulse will be passed by the diode and condenser C27 to the line 21 which is connected to line 20 through resistance R34 which is comparable in value to the conductive resistance of a diode. The line 21 is common to the diodes V21, V23, V25 and V27, so that if any of these conduct on pulsing, then a small pulse voltage will be developed across R34 and applied to the control grid of the pentode V29. This pentode is provided with an auto bias circuit similar to that of V28, and connections for anode and screen grid supplies to the H. T. line 22. It has a much shorter grid base and higher amplification factor than V28, so that the small amplitude pulse developed across R34 is capable of producing a positive output pulse on line 23 comparable in amplitude with that produced on line 24 when V28 is operated. The insertion of resistor R34 increases the amplitude of pulse developed between the diode cathodes and ground, so that the residual pulse passed on to the next diode pair is larger than when the other diode conducts, but it is still sufficiently small to produce no significant output on line 24. If desired, a pulse amplitude selection device of known form could be inserted in line 24, so that no output pulse occurs unless the pulse at the anode of V28 exceeds a certain amplitude.

Due to the D. C. level determining resistors, such as R39, and stray capacities, there will be some attenuation of the pulse in each diode unit even when the diodes are non-conducting. For this reason it is desirable that, if a large number of diode pairs are used in a chain, the chain should be split into groups and an amplifier inserted so that the amplitude of the pulse does not fall too low. For example, valve V28 might be followed by a second triode amplifier to invert the pulse on line 24 to a negative pulse, which is applied to the line corresponding to line 19 in the next group of diode pairs.

The circuit described thus provides means for comparing two values registered on trigger circuits and producing pulses which indicate whether one value is equal to or less than the second value. A pulse on line 24 indicates that values are equal, a pulse on line 23 indicates that the left hand value is less than the right hand value and no pulse on either line indicates that the left hand value is greater than the right hand value. These conditions of pulse or lack of pulse may be utilised to operate control circuits which determine the next operation to be performed by the dividing machine.

As already noted, column shifting of a value registered on an electronic counter has heretofore required the use of two counters in addition to some form of controllable network through which the values to be column shifted are passed. By using the diode comparing circuit already described, it is possible to use one counter only, and at the same time to eliminate the usual form of network.

Figure 3:
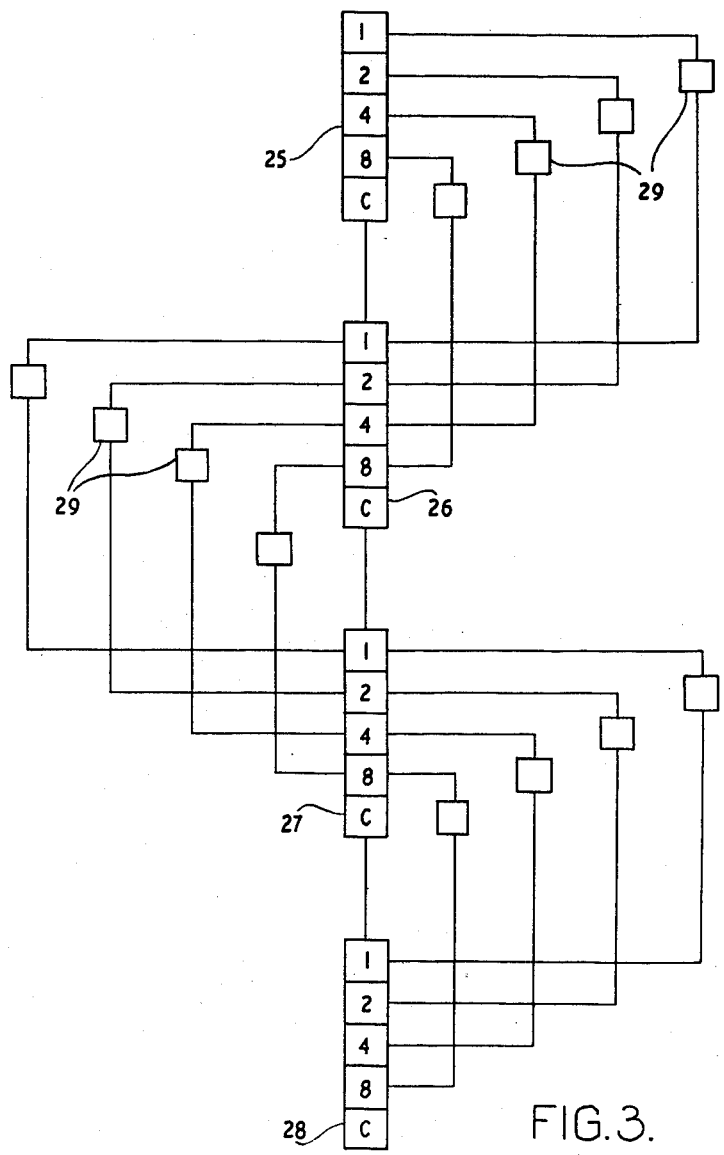
Figure 3 is a block diagram showing arrangements for effecting column shifting in a decimal counter.

Figure 3 shows in diagrammatic form a multi-denominational decimal counter comprising the denominations 25, 26, 27 and 28, the denomination referenced 25 being the lowest denomination. Each denomination comprises four trigger circuits registering respectively the values 1, 2, 4 and 8, and a carry registering trigger circuit C. The four binary counting stages may be converted to decimal operation by any convenient method, such as, for example, that shown in British Patent No. 609,502.

Each of the blocks 29 represents one diode comparing circuit such as the diodes V12 and V13, resistors R7, R8, R9, R10, R11 and condensers C5, C6 and C20, as shown in Figure 1. Thus the diode circuits in Figure 3 are connected between corresponding valued trigger circuits in adjacent denominations instead of between two counters. If the lines from the condensers corresponding to C20 (Figure 1) are connected to the trigger circuits in the higher denomination, then the value will be column-shifted upward, whereas if these lines are connected to a lower denomination, then the value will be column shifted downward. That is, if these output lines from the diode units connected between denominations 26 and 27 go to denomination 26, the value registered in denomination 27 will be column shifted into denomination 26. If these output lines go to denomination 27, then the value in denomination 26 will be transferred to denomination 27.

Figure 4:
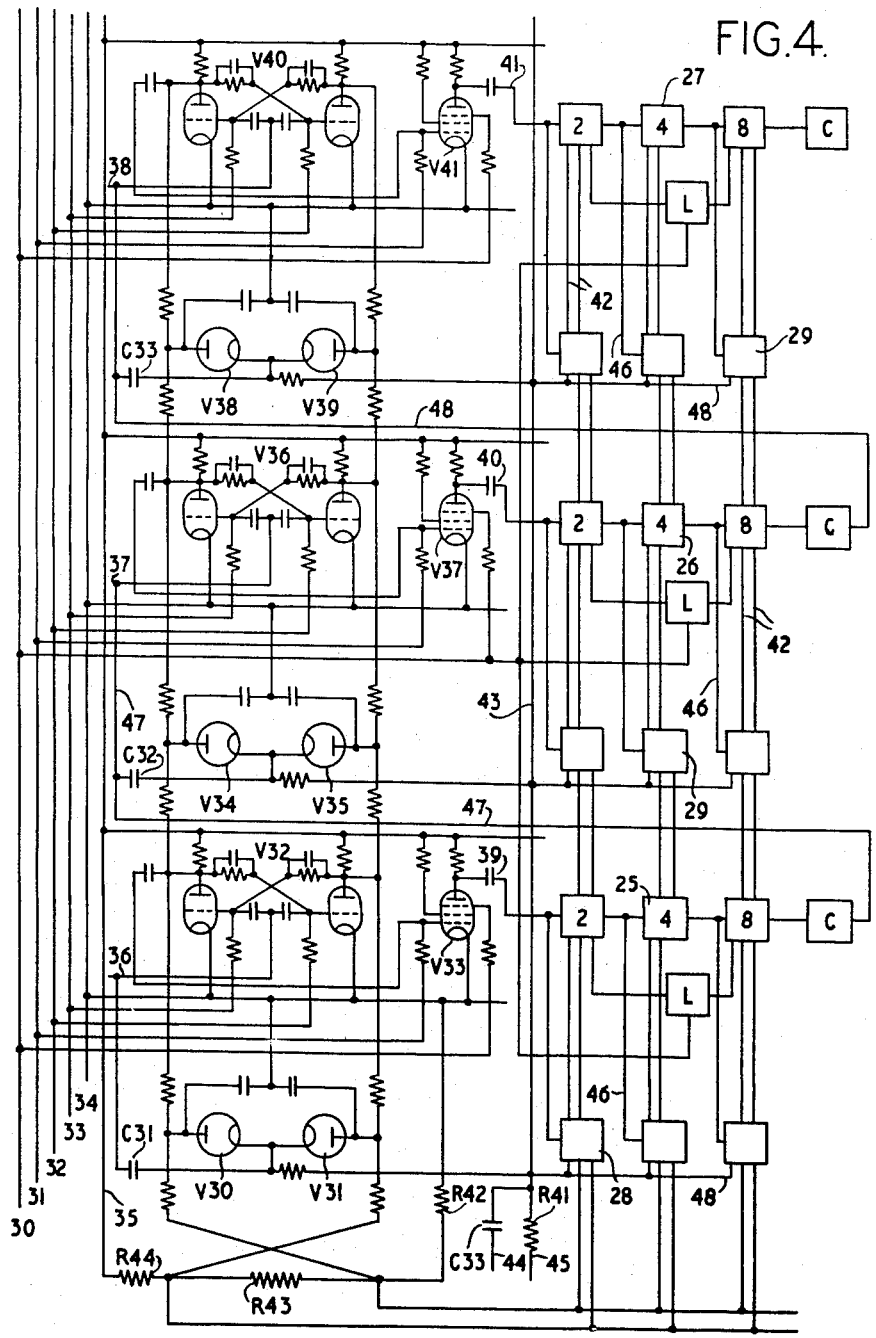
Figure 4 is a more detailed diagram of the devices shown in Figure 3.

A more detailed diagram of three of the denominations of the counter of Figure 3 is shown in Figure 4. The value 1 trigger circuits of the denominations 25, 26 and 27 are shown together with the associated diode comparing circuits.

The lowest denomination 25 comprises the value 1 trigger circuit V32 and the isolating pentode V33 and a similar combination of trigger circuit and isolating pentode for the other three stages 2, 4 and 8. Each of these stages is similar to V5 and V9 (Figure 1) and operates in the same fashion. In addition a lock valve L is provided to convert the four stages from binary to decimal operation. The carry stage C is set when the denomination goes from a registration of 9 to 10. The carry may be cleared by resetting the trigger circuit comprising stage C which produces a negative pulse on line 47 to effect an entry of one in denomination 26. Entries are effected in denomination 25 by applying the appropriate number of pulses to line 36. The remaining denominations are similarly arranged and it will be appreciated that further denominations could be added to increase the registering capacity of the complete counter.

Between the value 1 trigger circuits V32 and V36 is a diode pair V34, V35, with the output pulse transmitted via condenser C32 to the grids of the trigger circuit V36. The D. C. level of the diode cathodes is set by line 45, through resistor R41 and line 43 and the operating impulse is applied from line 44 via condenser C33. A second diode pair is similarly connected between trigger circuits V36 and V40.

Similar diode circuits referenced 29 are provided between the corresponding trigger circuits of adjacent denominations. The lines 42 indicate the connections from the two anodes of each trigger circuit to the related diode circuit and the lines 46 the pulse output lines corresponding, for example, to line 47. The connections from the diode units 29 to line 43 are made by lines 48.

When a negative pulse is applied to line 44 it will thus be transmitted to all the diode units and in the manner already explained the diode units will permit the pulse to be passed on if the trigger circuits to which they are connected are not in the same condition. Since the output lines such as 46 are connected to the higher of each denominationally adjacent pair of trigger circuits, the value from the lower will be transferred to the higher, that is, the value registered will have been column shifted up one denomination. It will be seen that the mechanism of the transfer is essentially similar to that of the circuit of Figure 1 except that the transfer takes place between adjacent denominations of one counter instead of corresponding denominations of two counters. As described in connection with Figure 1, the isolating pentodes such as V33 and the lock valves L are rendered inoperative by an increased negative bias on line 30 placing the suppressor grids below cut-off.

The supply lines 35, 34 and 31 are connected respectively to the positive H. T. supply, negative H. T. and ground, and bias for the control grids of the isolating pentodes. The supply lines 32 and 33 are bias lines for the trigger circuits comprising the counter.

When column shifting upward, after the first shift, it is necessary to reset the lowest denomination to zero and this is effected by a modified circuit for the diode units connected below the lowest denomination 25. The potentiometer resistors R44, R43 and R42 provide two fixed D. C. voltages which are applied to all four diode units. The resistor values are so proportioned that they provide the same voltages as a trigger circuit in the "off" or zero condition. Thus the settings of the four trigger circuits in denomination 25 are compared by these diodes with four settings representative of the "off" condition and will therefore be switched "off," if they are "on" when the pulse to effect column shifting is applied.

It will be appreciated that by connecting the output lines to the lower of the denominational pairs of trigger circuits instead of the higher, then the registered value will be column shifted downwards. In this case the diode circuits, such as V30, V31, with one fixed input are connected to the highest denomination so that this denomination is automatically zeroised on the first column shift. In either case, further column shifting may be obtained by applying a succession of pulses to line 44, one shift taking place for each pulse applied. If a fixed column shift of, say, two places is required, then the diode units may be connected between the first and third, the second and fourth denominations, etc., instead of between adjacent denominations.

As already noted, the time constants of the diode circuits are adjusted so that the potential of the diode anodes does not change appreciably during the duration of the operating impulse. This requires that the operating impulses should be timed so that the diode circuits have had sufficient time to establish their correct potentials dependent upon any change in the trigger circuit conditions before the next impulse is applied.

As described, column shift in either direction may be obtained by altering the trigger circuits to which connection of the output lines is made. It is, however, possible to obtain the effect of column shifting in either direction, whilst actually shifting in one direction only, by connecting the denominations in a ring formation. The diodes connected below the lowest denomination of the counter are disconnected from the fixed D. C. potentials representing trigger circuits in the "off" condition and connected instead to the trigger circuits of the highest denomination. If the registered value is now column shifted up one position, the value in the highest denomination will be transferred to the lowest denomination and the remaining values transferred up one denomination. If the value is column shifted a second time, then the value originally registered in the two highest denominations will occupy the two lowest denominations.

By a repetition of the process of column shifting upwards, an effective column shift downwards may be obtained. For example, if it is required that a ten denomination number registered in a ten denomination counter be column shifted downwards two denominations, then eight column shift operations upwards are performed. This then places the eight highest denominations, as originally registered, correctly in the counter. The remaining two denominations occupy the two top positions of the counter and special provision for this may be made in the value read-out arrangements of the counter. However, in many cases an answer correct to a fixed number of decimal places is required and in this case it may be desirable to ignore these two denominations for purpose of reading out.

Particularly in multiplying and dividing machines employed for accountancy is is necessary to deal with problems in which one factor is expressed in a non-uniform notation such as sterling currency or hours and minutes. In order to enable the machine to function in substantially the same manner as when both factors are expressed in the decimal notation, it is convenient to be able to effect column shifting, that is multiplication or division by ten, of the non-uniform factor.

The difficulties in column shifting when, say, the value is expressed in hours and minutes, arise when the receiving denomination and the reading out denomination are not counting in the same notation. Thus shifting a value from tens of hours to units of hours position may be carried out as already described, since both denominations are counting in decimal, but in going from units of hours to tens of minutes, special provision has to be made to allow for the fact that one denomination is counting in a scale of ten and the other in a scale of six. The entries to be made in lower denominations when a single downward column shift is effected for any particular value of units of hours are shown in Table V.

TABLE V

| Units of Hours | Tens of Minutes | Units of Minutes |
|---|---|---|
| 1 | 0 | 6 |
| 2 | 1 | 2 |
| 3 | 1 | 8 |
| 4 | 2 | 4 |
| 5 | 3 | 0 |
| 6 | 3 | 6 |
| 7 | 4 | 2 |
| 8 | 4 | 8 |
| 9 | 5 | 4 |

Since the values registered in the tens of minutes denomination will be shifted concurrently into the units of minutes denomination, the possibility arises that more than one entry will have to be made in the units denomination. For example, if the registration is one hour twenty minutes, then there will be entries of 2 and 4, that is 6, from the units of hours and an entry of 2 from the tens of minutes denomination, so that the value 2 trigger stage of the units of minutes denomination would have to accept two concurrent entries.

Figure 5:
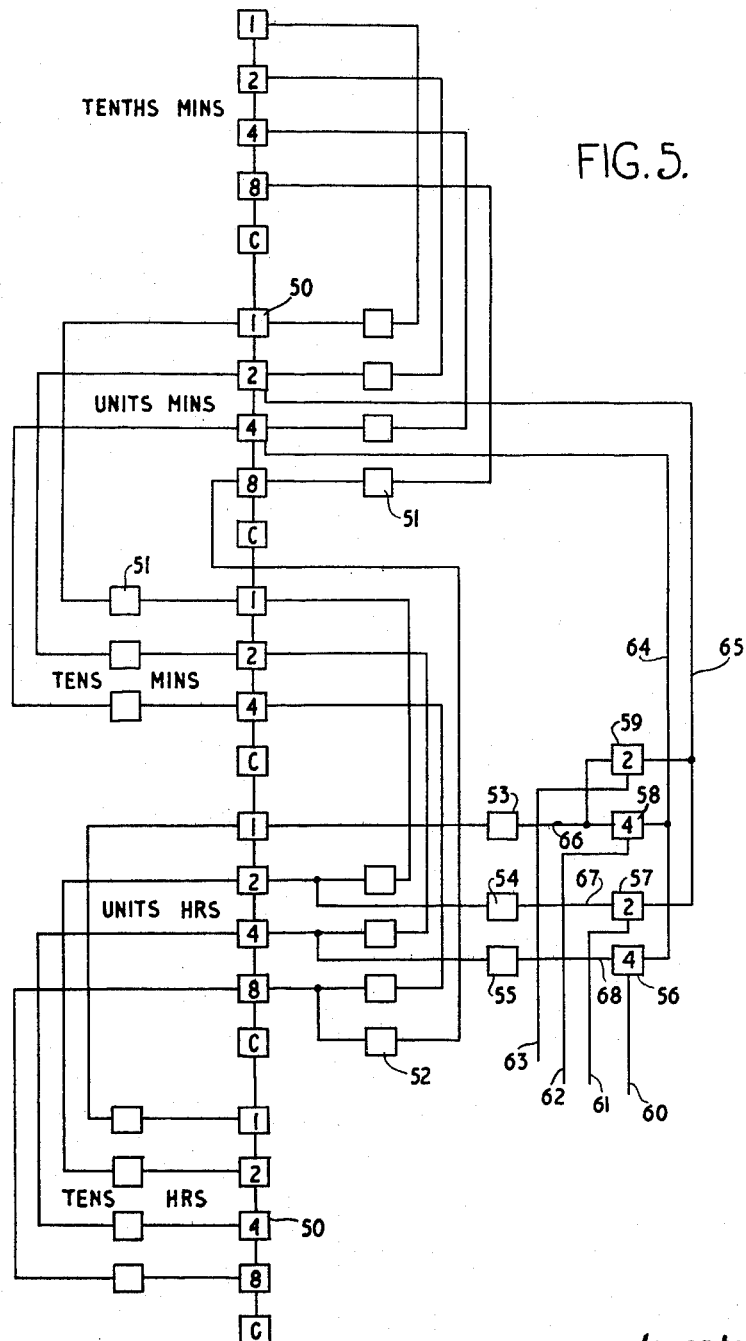
Figure 5 is a block diagram showing means for effecting column shifting in a counter employing a non-uniform notation.

The difficulty of concurrent multiple entries may be avoided by providing auxiliary trigger circuits to store certain of the entries, the registration of these circuits being cleared subsequent to the main column shift operation. As an example of this method, Figure 5 shows in block diagram form a counter registering hours and minutes with provision for column shifting downward.

All the denominations are of normal decimal type except the tens of minutes, in which the 8 value trigger circuit is omitted and the feedback connections, of the type shown, for example, in British Patent No. 609,502, are made between the 4 value and 2 value trigger circuits, thus reducing the counter capacity to six.

Transfer between tens and units of hours, tens and units of minutes, and units and tenths of minutes, is effected by diode units 51 in the same manner as that already described. In the interests of clarity, the connections between the anodes of the trigger circuits 50 and the diode units 51 are indicated by a single line. In each case, the output pulse from a diode unit serves to operate the lower value trigger circuit of each pair to which it is connected.

In the case of the transfer from units of hours to tens of minutes, this may also be effected directly by the diode units 51, but the connections are from the value 8 to 4, 4 to 2 and 2 to 1 trigger circuits to allow for the change in notation. In addition, a diode unit 52 is connected between the value 8 trigger circuit of the units of hours and the value 8 trigger circuit of the tens of minutes with the operating pulse from 52 being applied to the latter. Thus, if eight hours is registered, on column shifting down one place a registration of forty-eight minutes will be obtained.

Two auxiliary trigger circuits 57 and 59 representing the value 2 and two trigger circuits 56 and 58 representing the value 4 are used to register any entries to be made from the units of hours denomination in to the units of minutes. All these four trigger circuits are normally "off" and the diode units 53, 54 and 55 which are connected between these trigger circuits and the counter receive a pulse from the same source as the column-shifting pulse. Thus, if two hours is registered, then the output pulse will be applied from 54 to 57 to switch this trigger circuit "on." Similarly 56 may be set by the output pulse from 55, and 58 and 59 in parallel are set by the pulse from 53. Since the auxiliary trigger circuits are normally "off," they will be switched "on" whenever the corresponding counter trigger circuit is "on" at the time of column shifting, in the manner which has been described in connection with the circuits for data transfer.

In this way, after the column shifting pulse has been applied, correct entries will have been made as between each pair of decimal denominations, with additional corrective entries due to the non-uniform notation being registered on the trigger circuits 56, 57, 58 and 59. Negative pulses to reset these trigger circuits are now applied in sequence to lines 60, 61, 62 and 63. The lines 64 and 65 are connected to one anode of the trigger circuits so that on resetting from "on" to "off," a negative pulse is produced on the corresponding line 64 or 65 and thus applied to the 2 value or 4 value trigger circuit of the units of minutes denomination to effect the appropriate entry.

For example, if six hours had been registered, after the column shift pulse, the trigger circuits 56 and 57 will be set "on." When line 60 is pulsed trigger circuit 56 will be reset and a negative pulse will be transmitted on line 64 to enter four in the units of minutes. Line 61 is then pulsed to reset trigger circuit 57 which produces a pulse on line 65 to enter two into the units of minutes.

Provision is made to reset the carry trigger C pertaining to the units of minutes after the pulse has been applied to line 63.

The diode units 51, 52, 53, 54 and 55 are similar to that referenced V34, V35 in Figure 4. The trigger circuits 56, 57, 58 and 59, may be similar, for example, to VI (Figure 1).

By suitably re-arranging the connections of the auxiliary trigger circuits and the diode units, the circuit shown in Figure 4 may be adapted for column shifting upward. It will be appreciated that by the use of suitably connected auxiliary trigger circuits it is possible to use the diode circuits described for effecting column shifting in a counter using other non-uniform notations, such as sterling or rupees and annas.

Trigger circuits have been shown in the various embodiments of the invention and since these are operated by negative pulses, the diode circuits have been shown in a form suitable for operation by such pulses. It may be desired, however, to utilise positive operating impulses if, for example, a grid-controlled gas valve is to be triggered by the pulse. The diode units may be readily modified for this type of operation by reversing the diodes, that is, connecting the anodes together and one cathode to the junction of each pair of resistors. The standing D. C. potential applied to the anodes is then adjusted to be slightly positive with respect to the lowest voltage the cathodes can assume; on the figures previously given, this would be, say, 82 volts. This form of the circuit would then function, with a positive operating pulse, in exactly the same manner as the previously described circuits function with a negative pulse. To obtain the pair of digit representing voltages when a single gas filled valve is used as a data registering device, resistances may be inserted in both anode and cathode circuits of the valve, the diode unit then being connected between the anode and cathode of the valve instead of between the two anodes of a trigger circuit.

It will be appreciated that the operation of the diode unit is based upon the difference in impedance of a diode when the anode is respectively positive and negative with respect to the cathode, that is, upon the rectifying property. The vacuum diode is particularly suitable because of the high ratio of "reverse" to "forward" resistance, but other types, such as germanium diodes, having a sufficiently high ratio may also be employed.

What I claim is:

1. A comparison circuit comprising two data sources having two possible comparison states, means for generating a controlling voltage having a first magnitude on the existence of a first comparison state of said data sources and a second magnitude on the existence of a second comparison state of said data sources, a diode, connecting means for applying said controlling voltage to one of the electrodes of said diode, a source of voltage, means for connecting said voltage source to the other of said electrodes, the voltage of said voltage source rendering said diode conductive on the application of said controlling voltage of said first magnitude and non-conductive on the application of said controlling voltage of said second magnitude, an input circuit, an output circuit connected to said input circuit and a low impedance shunt path through said diode when conducting, also connected to said input circuit, an operating pulse applied to said input circuit being transmitted substantially unattenuated to said output circuit on the existence of said second comparison state and on the said diode being non-conductive but being attenunated on reaching said output circuit when the said first comparison state exists and said diode is rendered conductive.

2. A comparing circuit for comparing two data-representing voltages each having two possible magnitudes comprising voltage dividing means, means for applying said data-representing voltages to said voltage dividing means, a diode, means for connecting one of the electrodes of said diode to said voltage dividing means, a source of bias voltage connected to the other of said electrodes rendering said diode non-conductive on the application of a voltage from said voltage dividing means corresponding to a selected combination of said data-representing voltages and conductive for other combinations, an input circuit, an output circuit connected to said input circuit and a low impedance shunt path through said diode when conducting also connected to said input circuit, whereby an operating pulse applied to said input circuit is transmitted substantially unattenuated only when said diode is non-conductive on the existence of said selected combination of data-representing voltages.

3. A comparing circuit for comparing two data-representing voltages each having two possible magnitudes comprising two resistors connected in series, means for applying one of said data-representing voltages to one said resistor and the other of said data-representing voltages to the other said resistor, a diode having one electrode connected to the common point of said resistors, a source of voltage connected to the other electrode of said diode rendering said diode conductive and non-conductive in accordance with the values of said data-representing voltages, an input circuit, an output circuit connected with said input circuit and a low impedance shunt path through said diode when conducting also connected to said input circuit, whereby an operating pulse applied to said input circuit is transmitted substantially unattenuated to said output circuit only when said diode is non-conducting.

4. A comparing circuit for comparing two pairs of data-representing voltages, the voltages of each pair being either equal or unequal, comprising four resistors connected in two pairs, means for applying each said data-representing voltage to a separate resistor, two diodes having one pair of corresponding electrodes commoned and the other electrodes each connected to the centre points of a pair of said resistors, a source of constant potential connected to said commoned electrodes rendering either of said diodes conductive when said data-representing voltages applied to said resistors connected to that diode are equal and non-conductive when said data-representing voltages are unequal, a pulse input and a pulse output connected to said commoned electrodes, whereby a pulse applied to said input is transmitted substantially unattenuated to said output only when neither of said diodes are conductive.

5. A comparing system comprising a first static data registering device, means for generating a first pair of voltages the magnitudes of which are dependent on the data registered in said device, a second static data registering device, means for generating a second pair of voltages the magnitudes of which are dependent on the data registered in said second device, four resistors connected in two pairs, means for applying each of said voltages to a separate resistor, a pair of said resistors having applied thereto one of said first pair of voltages and one of said second pair of voltages, and the voltages applied to a pair of said resistors being equal or unequal in accordance with the data represented thereby, two diodes having one pair of corresponding electrodes commoned and the other electrodes each connected to the centre points of a pair of said resistors, a source of potential applied to said commoned electrodes rendering either of said electrodes conductive when said voltage is applied to said resistors connected to that diode are equal and non-conductive when those voltages are unequal, a pulse input and a pulse output connected to said commoned electrodes, whereby a pulse applied to said input is transmitted substantially unattentuated to said output only when neither of said diodes are conductive.

6. A comparing system comprising a first and a second static data registering device each having two possible states, for each said device a first conductor and a second conductor each having one of two potentials in accordance with the state of that said device, a first pair of resistors in series connecting said first conductor of said first device and said first conductor of said second device, a second pair of resistors in series connecting said second conductor of said first device and said second conductor of said second device, the voltages applied to a pair of resistors being equal and unequal when said devices are in the same states and different states respectively, two diodes having one pair of corresponding electrodes commoned and the other electrodes each connected to the centre points of a pair of said resistors, a source of potential applied to said commoned electrodes rendering either of said electrodes conductive when said voltages applied to said resistors connected to that diode are equal and non-conductive when those voltages are unequal, a pulse input and a pulse output connected to said commoned electrodes, whereby a pulse applied to said input is transmitted substantially unattenuated to said output only when neither of said diodes is conductive.

7. A comparing circuit comprising a first and a second static registering device each having two possible states, for each said device a first conductor and a second conductor each having one of two electric potentials in accordance with the state of said device, a first pair of resistors in series connecting said first conductor of said first device and said first conductor of said second device, a second pair of resistors in series connecting said second conductors of said devices, the potentials applied to either said pair of resistors being substantially equal and unequal when said devices are in the same states and different states respectively, two diodes having one pair of corresponding electrodes commoned and the other electrodes each connected to the centre points of a pair of said resistors, a source of bias voltage applied to said commoned electrodes rendering either of said diodes conductive and non-conductive when the potentials applied to the pair of resistors connected to that diode are and are not equal at one of said potentials respectively, a pulse input and a pulse output connected to said commoned electrodes and circuit means connected to said output for changing the state of one of said data-registering devices when a pulse appears at said output, whereby, when said devices are in the same state, one of said diodes is rendered conductive and a pulse applied to said input is shunted through said conductive diode before reaching said output whereas when said devices are in different states, neither of said diodes is rendered conductive and a pulse applied to said input is transmitted unattenuated to said output and the said devices are brought into the same state.

8. A data comparing system comprising a plurality of pairs of static data registering devices, a data comparing circuit for each of said pair of devices, said comparing circuit comprising a diode, means for rendering said diode conductive and non-conductive in accordance with relative states of said pair of devices, a pulse input, a pulse output connected to said pulse input and a low impedance shunt path through said diode when conductive connected to said pulse input; and a connection between the output of one said comparing circuit and the input of a subsequent comparing circuit whereby a pulse applied to an input of a first comparing circuit is transmitted to a subsequent comparing circuit only if said diode of said first comparing circuit is non-conductive, and the states of said pairs of devices are compared serially until the pulse reaches a comparing circuit having a conductive diode.

9. A data comparing system comprising a plurality of pairs of static registering devices, a data comparing circuit for each said pair of devices, each said comparing circuit comprising a diode, means for rendering said diode conductive in accordance with the relative states of said pair of devices, a pulse input, a pulse output connected to said pulse input and a low impedance shunt path through said diode when conductive connected to said pulse input; and a connection connecting the pulse inputs of all said comparing circuits whereby, on an electric pulse being applied to said inputs, a pulse is transmitted to said output of each said comparing circuit having a non-conductive diode, the pulse being attenuated in each said comparing circuit in which said diode is conductive.

10. A data comparing system comprising two sets of static data-registering devices for registering two values to be compared, each said device comprising two connected grid-controlled valves, means for rendering one of said valves conducting in accordance with the value registered in said device; a data comparing circuit between each device of one said set and the corresponding device of the other said set which circuit comprises a pair of diodes having a corresponding terminal commoned, the other terminal of each said diode being connected to the centre point of the two resistors, connecting means for applying the anode voltages of the grid controlled valves of the pair of devices to the ends of said resistors, the resistors connected to a diode being also connected to one grid controlled valve of each device, a source of voltage connected to said commoned electrodes rendering either of said diodes conductive only when the grid controlled valves connected to the other electrode of said diode are both non-conductive, a pulse input and a pulse output connected to said commoned electrodes; and connecting means connecting said inputs of all said comparing circuits whereby on an electric pulse being applied to said inputs, a pulse is transmitted to said output of each said comparing circuit having the associated registering devices in different conductive conditions, whereas the pulse is attenuated in each said comparing circuit having the associated registering devices in the same conductive condition.

11. A data comparing system according to claim 10 comprising also, for each said comparing circuit, means connected to said output and operated by a pulse transmitted to said output for changing the conductive state of the device of one of said sets associated with said comparing circuit whereby the values registered in said sets of devices are brought into agreement.

12. A comparison circuit comprising two data sources having two possible comparison states, means for generating a controlling voltage having a first magnitude on the existence of a first comparison state of said data sources and a second magnitude on the existence of a second comparison state of said data sources, a diode, connecting means for applying said controlling voltage to one of the electrodes of said diode, said first magnitude and said second magnitude of said controlling voltage rendering said diode conductive and non-conductive respectively, an input circuit, an output circuit connected to said input circuit, and a low impedance shunt path through said diode also connected to said input circuit, an operating pulse applied to said input circuit being transmitted substantially unattenuated to said output circuit on the existence of said second comparison state and on said diode being non-conductive but being attenuated on reaching said output circuit when said first comparison state exists and said diode is rendered conductive.

References Cited in the file of this patent

UNITED STATES PATENTS

| | | |
|---|---|---|
| 2,585,630 | Crosman | Feb. 12, 1952 |
| 2,597,796 | Hindall | May 30, 1952 |
| 2,607,006 | Hoeppner | Aug. 12, 1952 |
| 2,641,696 | Woolard | June 9, 1953 |

OTHER REFERENCES

"Electrical Counting," by W. B. Lewis; New York: The Macmillan Co., 1943; pages 86–89.